(12) United States Patent
Tran et al.

(10) Patent No.: US 10,706,350 B1
(45) Date of Patent: Jul. 7, 2020

(54) VIDEO ANALYSIS USING CONVOLUTIONAL NETWORKS

(71) Applicant: Facebook, Inc., Menlo Park, CA (US)

(72) Inventors: Du Le Hong Tran, Palo Alto, CA (US); Benjamin Ray, Palo Alto, CA (US); Balmanohar Paluri, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 141 days.

(21) Appl. No.: 16/101,356

(22) Filed: Aug. 10, 2018

Related U.S. Application Data

(60) Provisional application No. 62/544,730, filed on Aug. 11, 2017.

(51) Int. Cl.
*G06K 9/00* (2006.01)
*G06N 3/04* (2006.01)
*G06N 3/08* (2006.01)
*G06K 9/62* (2006.01)

(52) U.S. Cl.
CPC .......... *G06N 3/04* (2013.01); *G06K 9/00711* (2013.01); *G06K 9/628* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,858,636 B1 * | 1/2018 | Lim | G06T 5/001 |
| 2008/0205854 A1 * | 8/2008 | Xu | H04N 19/117 386/269 |
| 2010/0241601 A1 * | 9/2010 | Carson | G06N 3/02 706/27 |
| 2011/0007982 A1 * | 1/2011 | Su | G06T 5/002 382/260 |
| 2015/0178246 A1 * | 6/2015 | Herrero Abellanas | G06F 17/153 708/300 |
| 2016/0086078 A1 * | 3/2016 | Ji | G06K 9/4628 382/157 |

* cited by examiner

*Primary Examiner* — Hadi Akhavannik
(74) *Attorney, Agent, or Firm* — Baker Botts L.L.P.

(57) ABSTRACT

In one embodiment, a method includes, by a computing device, receiving a plurality of inputs for a convolution layer of a convolutional neural network, the convolution layer having one or more input channels and one or more output channels, wherein the inputs are received via the input channels, generating, by convolving the inputs with one or more two-dimensional filters, a plurality of intermediate values, and generating, by convolving the intermediate values with one or more one-dimensional filters, a plurality of outputs, wherein the one-dimensional filters receive the intermediate values from the two-dimensional filters via intermediate channels. The method may provide the outputs to a subsequent layer of the convolutional neural network via the output channels. Each of the two dimensions of the two-dimensional filter may correspond to a spatial dimension, and the one dimension of the one-dimensional filter may correspond to a temporal dimension.

19 Claims, 5 Drawing Sheets

- 410 — receiving a plurality of inputs for a convolution layer of a convolutional neural network, the convolution layer having one or more input channels and one or more output channels, wherein the inputs are received via the input channels

- 420 — generating, by convolving the inputs with one or more two-dimensional filters, a plurality of intermediate results

- 430 — generating, by convolving the intermediate results with one or more one-dimensional filters, a plurality of outputs, wherein the one-dimensional filters receive the intermediate values from the two-dimensional filters via one or more intermediate channels

- 440 — providing the outputs to a subsequent layer of the convolutional neural network via the output channels

VIDEO ANALYSIS USING CONVOLUTIONAL NETWORKS

PRIORITY

This application claims the benefit, under 35 U.S.C. § 119(e), of U.S. Provisional Patent Application No. 62/544,730, filed 11 Aug. 2017, which is incorporated herein by reference.

TECHNICAL FIELD

This disclosure generally relates to use of convolutional neural networks for data analysis.

BACKGROUND

In machine learning, a convolutional neural network (CNN) is a class of deep, feedforward artificial neural networks, which may be applied to analyzing visual imagery. The neuron connectivity pattern in a CNN is based on the organization of the visual cortex. Neurons may respond to input in a restricted region of space known as the receptive field. Receptive fields may partially overlap, overcovering the entire visual field. Neuron response may be approximated mathematically by a convolution operation. A CNN may include an input and an output layer, as well as multiple hidden layers. The hidden layers of a CNN may include convolutional layers, pooling layers, fully connected layers and normalization layers. Convolutional layers may apply a convolution operation to the input, passing the result to the next layer. The convolution models the response of an individual neuron to visual input. Each convolutional neuron may process data only for its receptive field.

The term "convolution" in neural networks may refer to a cross-correlation operation in which a filter, which may be represented as a matrix, is applied to input data, e.g., an image, which may also be represented as a matrix, using a sliding-window dot-product. For example, a filter matrix, analogous to a receptive field in a larger visual field, may be moved across an input matrix in a sequence of steps. A dot-product operation between the input matrix and the filter matrix may be performed at each step to generate a numeric value. The numeric value may then be stored in an output matrix. The filter matrix may be moved by a distance of one position, e.g., to the next adjacent element in a particular direction at each step, or by a larger distance, e.g., two or more positions. The distance by which the filter matrix is moved is referred to as the stride of the convolution. The network may learn the filters, unlike traditional algorithms, in which filter values may be determined by hand.

Although fully-connected feedforward neural networks can be used to learn features as well as classify data, the number of neurons used for image processing in a feedforward network is large because each pixel in an image may be a variable, and the number of weights for each neuron in a fully-connected network may be based on the size of the image, which may result in thousands of parameters. The convolution operation reduces the number of parameters. For example, regardless of image size, using the sliding-window filter to tile regions of size 6×6, each with the same shared weights, may involve 36 learnable parameters. CNNs may thus be deeper and have fewer parameters than fully-connected networks.

SUMMARY OF PARTICULAR EMBODIMENTS

In particular embodiments, convolutional neural networks may perform data analysis operations such as pattern recognition and action recognition in videos using convolutions over the data. The convolutional neural networks may be three-dimensional ("3D") residual networks in which convolutions may be over the frames of video. 3D residual networks may have two spatial dimensions (e.g., frame width and height) and one temporal dimension (e.g., the sequence of frames that form the video). The convolutional neural networks may alternatively be mixed-convolution ("MC") networks, in which 3D convolutions may be used in certain layers of the network, e.g., the early layers, and two-dimensional ("2D") convolutions may be used in other layers, e.g., the "top" layers in the network that are located farther from the input. For example, motion modeling may be a relatively low-level or mid-level operation that can be implemented via 3D convolutions in the early layers of a network that are closer to the input, and spatial reasoning over the motion features may be implemented by 2D convolutions in the top layers to achieve action recognition. In particular embodiments, the convolutional neural networks may use two successive operations, a 2D spatial convolution and a one-dimensional ("1D") temporal convolution, in place of each single 3D convolution. Networks that use a combination of 2D and 1D convolutions in this way are referred to herein as "Res2.5D" networks and include additional nonlinear rectification between the 2D and 1D operations, which may effectively double the number of nonlinearities compared to a network using 3D convolutions for the same number of parameters. Res2.5D networks may thus be capable of representing more complex functions. Further, the decomposition of 3D convolutions into 2D and 1D convolutions may enable optimizations that can result in lower training loss and lower testing loss.

In one embodiment, a 3D convolution layer having 3D filters in a convolutional network may be replaced by a "2.5D" block that has the same number of input channels as the 3D convolution layer. The 2.5D block may include a 2D convolution layer having 2D filters and a 1D convolution layer having 1D filters. The 2.5D block may use a method that includes, by a computing device, receiving a plurality of inputs for a convolution layer of a convolutional neural network, generating, by convolving the inputs with one or more two-dimensional filters, a plurality of intermediate values, and generating, by convolving the intermediate values with one or more one-dimensional filters, a plurality of outputs. The one-dimensional filters may receive the intermediate values from the two-dimensional filters via intermediate channels. The method may provide the outputs to a subsequent layer of the convolutional neural network via the output channels.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, convolutional neural networks may perform data analysis such as pattern recognition and action recognition in videos using convolutions over the data. The convolutional neural networks may be three-dimensional residual networks ("Res3D") in which convolutions may be over the frames of video. 3D residual networks may have two spatial dimensions (e.g., frame width and height) and one temporal dimension (e.g., the sequence of frames that form a video). The convolutional neural networks may alternatively be mixed-convolution ("MC") networks in which 3D convolutions are used in certain layers of the network, e.g., the early layers, and 2D convolutions are used in other layers, e.g., the "top" layers in the network that are located farther from the input. For example, motion modeling may be a relatively low-level or mid-level operation that can be implemented via 3D convolutions in the early layers of a network that are closer to the input, and spatial reasoning over the motion features may be implemented by 2D convolutions in the top layers to achieve action recognition. In particular embodiments, the convolutional neural networks may use two successive operations, a 2D spatial convolution and a 1D temporal convolution, in place of each single 3D convolution. Networks that use a combination of 2D and 1D convolutions in this way are referred to herein as "Res2.5D" networks and include additional nonlinear rectification between the 2D and 1D operations, which may effectively double the number of nonlinearities compared to a network using 3D convolutions for the same number of parameters. Res2.5D networks may thus be capable of representing more complex functions. Further, the decomposition of 3D convolutions into 2D and 1D convolutions may enable optimizations that can result in lower training loss and lower testing loss. The factorized spatial and temporal components may be more easily optimized because they are less tightly coupled than 3D filters, in which appearance and dynamics may be jointly intertwined. Although the examples described herein apply convolutional networks to video analysis, the convolutional networks may be used for other applications, such as analyzing medical images, natural language processing, text classification, optical character recognition, and so on.

Figure 1:
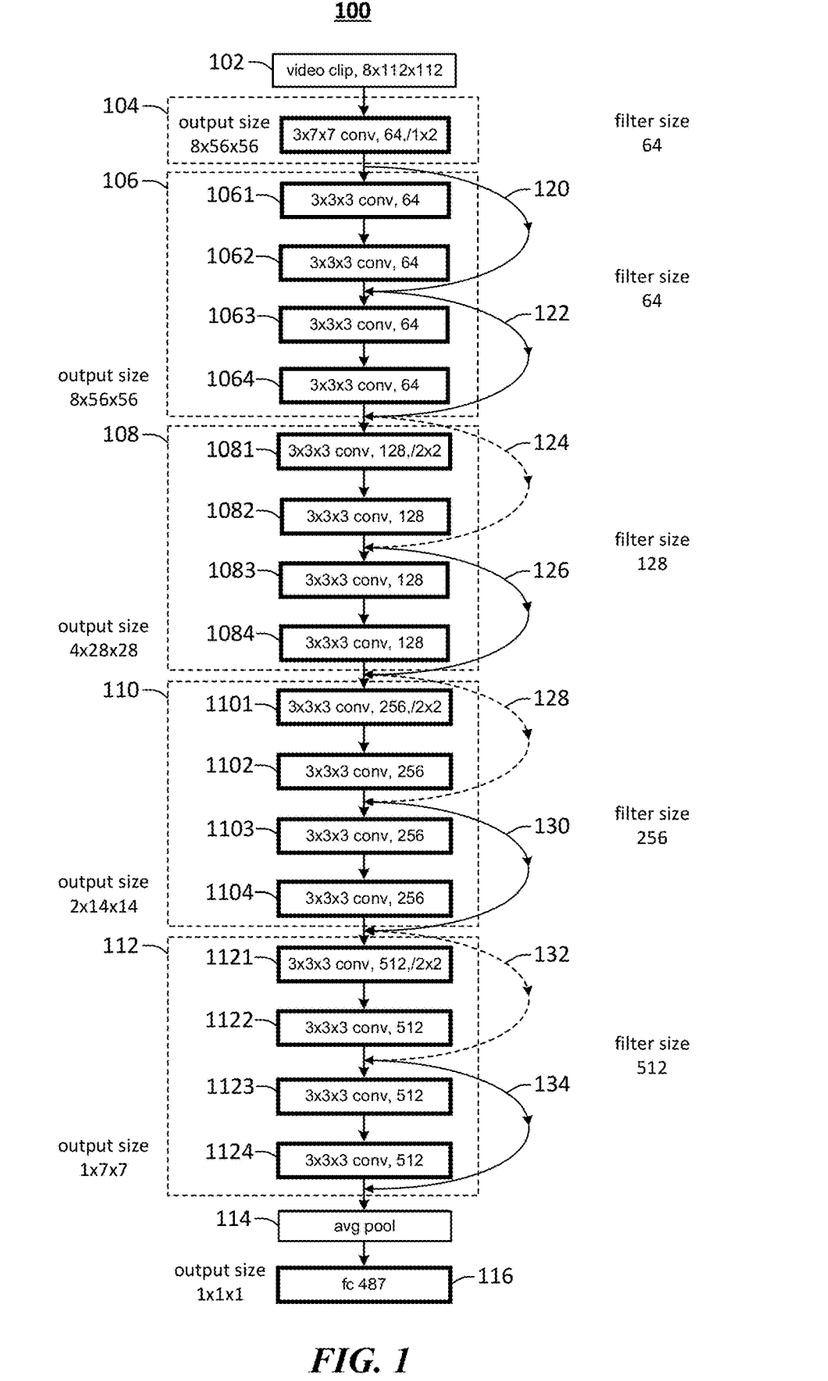
FIG. 1 illustrates an example neural network architecture for learning features of a video clip.

FIG. 1 illustrates an example neural network architecture 100 for learning features of an input video clip 102. The input video clip 102 may include a number of frames at a particular resolution. The neural network architecture 100 may be used to classify the input video clip 102 into one or more categories and provide the classification of the video clip 102 as output. The network architecture 100 is an example deep 3-dimensional (3D) convolutional network ("ConvNet"). The network architecture 100 may include a set of layers 104-116. Each layer may receive one or more inputs and may generate one or more outputs based on the inputs. The outputs of a layer may be provided to a subsequent layer as inputs. The layers 104-116 may include convolution layers 104-112, one or more averaging pool layers 114, and one or more fully-connected layers 116. The inputs and outputs may be one-dimensional (1D), e.g., a vector of one or more numbers, two-dimensional (2D), e.g., a two-dimensional matrix of numbers, or three-dimensional (3D), e.g., a three-dimensional matrix of numbers. Each of the convolution layers 104-112 may convolve one or more filters with one or more inputs to generate one or more outputs. A filter may be 1D, 2D, or 3D.

In particular embodiments, the network architecture 100 may include residual connections 120-134 that may bypass one or more of the layers. The residual connections may simply perform identity mapping, and their outputs may be added to the outputs of the bypassed layers, as shown by the lines in FIG. 1. This architecture may outperform previous convolutional networks (which do not use residuals) on accuracy benchmarks, while being faster at inference time, smaller in model size, and having a more compact representation. A 3D ConvNet with residual connections 120-134 may be referred to as a "3D ResNet."

In particular embodiments, down-sampling may be performed between layers of the network architecture 100. Down-sampling may use a stride of 1, 2, or the like. Down-sampling strides are shown in FIG. 1 in the format t×s, where t represents a stride in a temporal dimension and s represents a stride in one or more spatial dimensions. For example, layer 102 has a stride 1×2, which is a stride of 1 in the temporal direction and 2 in the spatial direction(s). Dashed lines 124, 128, 132 represent residual connections with down-sampling.

In particular embodiments, each convolution layer may perform a one-dimensional (1D) convolution, a two-dimensional (2D) convolution, or a three-dimensional (3D) convolution. A 1D convolution may be understood as movement of the filter across the input in one dimension. A 2D convolution may be understood as movement of the filter across the input in two dimensions. A 3D convolution may be understood as movement of the filter across the input in three dimensions.

In particular embodiments, the network architecture 100 may have input dimensions of 8×112×112. As an example, the input video clip 102 may have 8 frames, and each frame may be an image having a resolution of 112×112 pixels (e.g., 112 pixels high by 112 pixels wide). The size of this example video clip is thus 8×112×112 pixels. These particular dimensions are provided by way of example, and other input dimensions may be used instead or in addition. For example, the input dimensions may be chosen as the largest dimensions for which the input can fit within the memory of a particular GPU (graphics processing unit) while maintaining a large enough mini-batch.

In particular embodiments, every other frame or every Nth frame may be skipped (e.g., not processed), since consecutive frames are often similar. In the example network architecture 100, the input is 8×112×112, and convolutions are 3×d×d, where d is the number of elements in one dimension of a filter, with down-sampling convolution layers using stride 2×2×2 except for the conv1 layer, which uses stride 1×2×2. Note that these parameters are used by way of example, and other parameters may be used in other examples.

In the network architecture 100, a convolution layer conv1 104 may receive the video clip 102 as input and convolve the input with a filter to generate an output of size 8×56×56. The conv1 layer 104 provides its output to a layer conv2_1 1061, which is the first layer in a conv1_x group 106 of four layers. The group 106 includes layers conv2_1 1061, conv2_2 1062, conv2_3 1063, and conv2_4 1064, each of which performs a 3×3×3 convolution using a filter size of 64. The filters values may be learned. The conv2_1 1061 and conv2_2 1062 layers form a residual block (as shown in brackets in FIG. 2B). Each residual block is enclosed by a residual connection, such as the residual connection 120. Two blocks form the group 106. The output size of the group 106 is 8×56×56, which is reduced from the video clip size of 8×112×112. The conv2_4 layer 1064 provides its output to the conv3_1 layer 1081, which is the first layer in a conv3_x group 108 of four layers.

The example conv3_x group 108 includes layers conv3_1 1081, conv3_2 1082, conv_3 1083, and conv3_4 1084, each of which performs a 3×3×3 convolution using a filter size of 128 to generate an output of size 4×28×28. The filter size has doubled, while the output size has halved relative to the previous group 106, so that the combined size does not change substantially between groups. This pattern of halving the output size and doubling the filter size continues in the groups 108, 110, 112. The conv3_4 layer 1084 provides its output to the conv4_1 layer 1101, which is the first layer in a conv4_x group 110 of four layers.

The example conv4_x group 110 includes layers conv4_1 1101, conv4_2 1102, conv4_3 1103, and conv4_4 1104, each of which performs a 3×3×3 convolution using a filter size of 256 to generate an output of size 2×14×14. The conv4_4 layer 1104 provides its output to the conv5_1 layer 1121, which is the first layer in a conv5_x group 112 of four layers.

The example conv5_x group 112 includes layers conv5_1 1121, conv5_2 1122, conv5_3 1123, and conv5_4 1124, each of which performs a 3×3×3 convolution using a filter size of 512 to generate an output of size 1×7×7. The conv5_4 layer 1124 provides its output to the averaging pool layer 114. The averaging pool layer 114 may receive the output of the conv5_4 layer 1124 as input and perform down-sampling or other operations to reduce the size of the input. As an example, the averaging pool layer 114 may perform global average pooling over the spatiotemporal volume. The fully-connected layer(s) 116 may receive the output of the averaging pool layer 114 as input and generate the final classification prediction for the video clip 102 based on the input to the fully-connected layer(s) 116. The classification prediction may be represented as an output of size 1×1×1. Although the network architecture 100 is shown with particular layers 104-116 in this example, the network architecture 100 may have different layers in other examples.

In particular embodiments, image representations may be learned with convolutional neural networks by pretraining on a database such as ImageNet or the like. The spatiotemporal representation, which includes multiple frames to represent a video over time, incorporates motion patterns not ordinarily captured by appearance-based models.

Figure 2A:
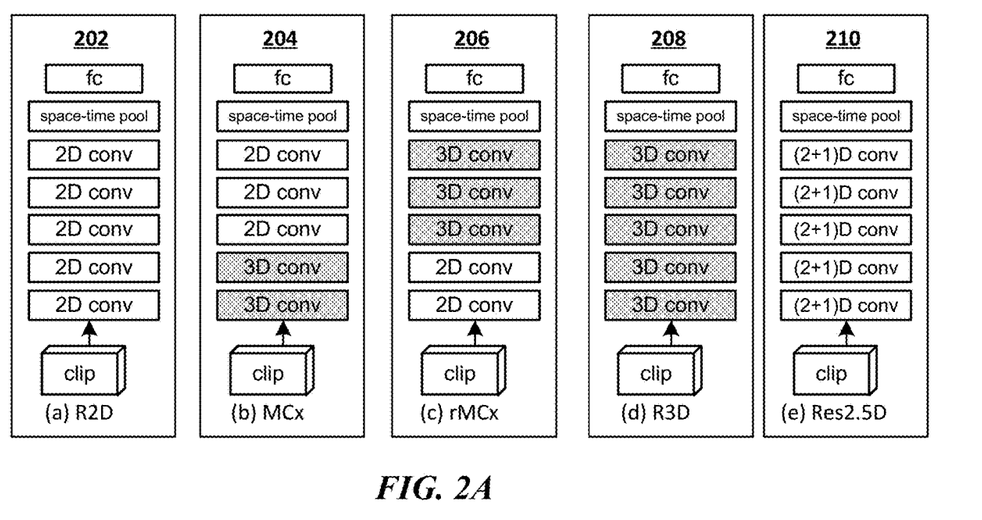
FIG. 2A illustrates residual network architectures for video classification.

FIG. 2A illustrates residual network architectures 202-210 for video classification. The network architectures shown in FIG. 2A include R2D 202, which include 2D ResNets, MCx 204, which include ResNets with mixed convolutions (MC3 is illustrated), rMCx 206, which use reversed mixed convolutions (rMC3 is illustrated), R3D, which include 3D ResNets, and Res2.5D, which include ResNets with blocks of 2D and 1D convolutions. (Residual connections are not shown in FIG. 2A.) The symbol x is used herein to denote an input clip of size 3×L×H×W, where L is the number of frames in the clip, H and W are the frame height and width, and 3 refers to the three RGB channels. Further, $z_i$ denotes a tensor computed by the i-th convolutional block in the residual network. Each block may include two convolutional layers with a ReLU activation function after each layer. Then the output of the i-th residual block may be given by:

$$z_i = z_{i-1} + F(z_{i-1}; \theta_i)$$

where $F(; \theta_i)$ implements the composition of two convolutions parameterized by weights $\theta_i$ and the application of the ReLU functions. The sequence of convolutional residual blocks may culminate into a top layer that performs global average pooling over the spatiotemporal volume and a fully-connected layer that generates a classification prediction.

The network architectures R2D 202 may use 2D convolutions over a video clip. Using such 2D convolutional neural networks (CNNs) for video may ignore the temporal ordering in the video and treat the L frames analogously to channels. Thus, these network architectures may be understood as reshaping the input 4D tensor x into a 3D tensor of size 3L×H×W. The output $z_i$ of the i-th residual block is also a 3D tensor. Its size is $N_i \times H_i \times W_i$ where $N_i$ denotes the number of convolutional filters applied in the i-th block, and $H_i$, $W_i$ are the spatial dimensions, which may be smaller than the original input frame as a result of pooling or striding. Each filter may be 3D and may have size $N_{i-1} \times d \times d$, where d denotes the spatial width and height. Note that although the filter may be 3-dimensional, it may be convolved only in 2D over the spatial dimensions of the preceding tensor $z_i-1$. Each filter may yield a single-channel output. Thus, the first convolutional layer in R2D may collapse the temporal information of the video in single-channel feature maps, which may prevent temporal reasoning from occurring in subsequent layers.

In particular embodiments, the network architectures R3D 208 may use 3D convolutions. 3D CNNs may preserve temporal information and propagate it through the layers of the network. The tensor $z_i$ is in this case 4D and has size $N_i \times L \times H_i \times W_i$, where $N_i$ is the number of filters used in the i-th block. Each R3D filter may be 4-dimensional with size $N_{i-1} \times t \times d \times d$ where t denotes the temporal extent (e.g., temporal depth) of the filter. The value of t may be, e.g., 2, 3, 4, or other suitable value. The filters may be convolved in 3D, e.g., over both time and space dimensions.

In particular embodiments, the network architectures MCx 204 and rMCx 206 may use mixed 3D-2D convolutions. Motion modeling (e.g., 3D convolutions) may be particularly useful in the early layers, while at higher levels of semantic abstraction (late layers), motion or temporal modeling may be less important. An MCx 204 architecture may start with 3D convolutions and switch to using 2D convolutions in the top layers. In particular embodiments, 3D ResNets (R3D 208) may have 5 groups of convolutions, as shown in FIG. 1. Thus, an example MCx 204 architecture may be constructed by replacing the 3D convolutions in the conv5_x group 112 with 2D convolutions. Another example of MCx 204 may uses 2D convolutions in group 4 and 5. This architecture is named MC4 (meaning from group 4 and deeper layers, convolutions are 2D). Following this pattern, MC3 and MC2 variations may also be constructed. Note that MC 1 corresponds to a 2D ResNet (R2D 202) applied to video clip inputs.

In particular embodiments, temporal modeling may be more beneficial in the deep layers, with early capturing of appearance information via 2D convolutions. "Reversed" Mixed Convolutions rMCx 206 may be used in such cases. Following the naming convention of the MC architectures, the reverse architectures are named rMC2, rMC3, rMC4, and rMC5. Thus, rMC3 206 may include 2D convolutions in block 1 and 2, and 3D convolutions in group 3 and deeper groups.

Figure 3A:
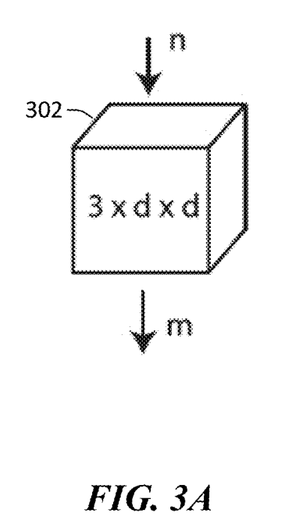
FIG. 3A illustrates an example 3D convolution layer.
Figure 3B:
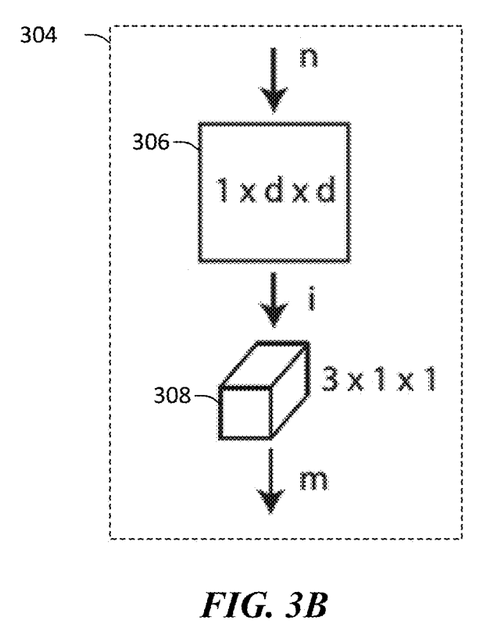
FIG. 3B illustrates an example mixed 2D and 1D convolution block.

In particular embodiments, a 3D convolution may be approximated by a 2D convolution followed by a 1D convolution, decomposing spatial and temporal modeling into two separate steps. In the network architectures Res2.5D 210, the $N_i$ 3D convolutional filters of size $N_{i-1} \times t \times d \times d$ may be replaced with a Res2.5D block having $M_i$ 2D convolutional filters of size $N_{i-1} \times 1 \times d \times d$ and $N_i$ temporal convolutional filters of size $M_i \times t \times 1 \times 1$. The hyperparameter $M_i$ may determine the dimensionality of the intermediate sub-space where the signal is projected between the spatial and the temporal convolutions. $M_i$ may be determined based on the filter's spatial size d, time depth t, the number of filters used in the (i−1)-th block ($N_{i-1}$) and the number of filters used in the i-th block ($N_i$), as $$M_i = \left\lfloor \frac{td^2 N_{i-1} N_i}{d^2 N_{i-1} + t N_i} \right\rfloor$$

so that the number of parameters in the Res2.5D block is approximately equal to that implementing the 3D convolution. This spatiotemporal decomposition may be applied to any 3D convolutional layer. An illustration of this decomposition is shown in FIGS. 3A and 3B. If the 3D convolution has spatial or temporal striding (e.g., implementing downsampling), the striding may correspondingly be decomposed into its spatial or temporal dimensions. Although $M_i$ is determined in a particular way in this example, $M_i$ may be determined in other ways in other examples, e.g., using the ceiling operator instead of the floor operator, or using another different function based on the values of one or more of t, d, $N_{i-1}$, or $N_i$.

Compared to 3D convolution, the Res2.5D decomposition doubles the number of nonlinearities in the network because of the additional ReLU between the 2D and 1D convolution in each block (without changing the number of parameters). Increasing the number of nonlinearities may increase the complexity of functions that can be represented. Further, decomposing the 3D convolution into separate spatial and temporal components makes optimization easier and may reduce training error compared to 3D convolutional networks of the same capacity.

Figure 2B:
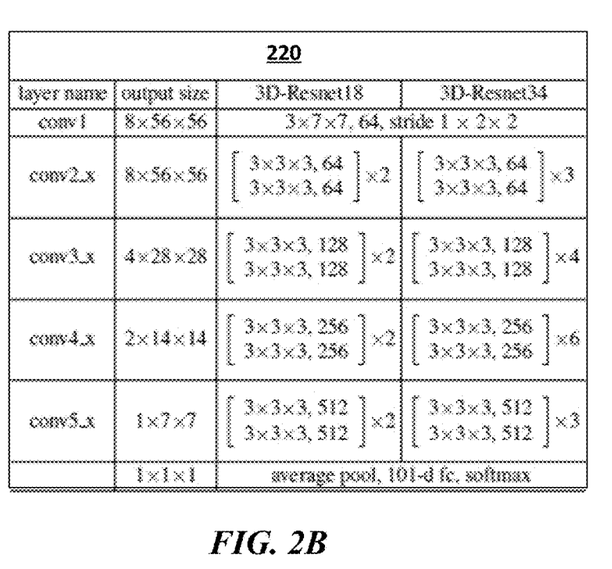
FIG. 2B illustrates two example neural network architectures of different depths for learning features of a video clip.

FIG. 2B illustrates two example 3D neural network architectures of different depths for learning features of a video clip. In table 220 of FIG. 2B, input, kernel, and output are denoted as L×H×W (3D tensors), where L, H, and W may correspond to temporal length, spatial height, and spatial width, respectively. Temporal length may be, for example, a number of consecutive frames in a video clip, e.g., 4, 8, 16, 20, or other appropriate number of frames. Height and width may be in pixels. In FIG. 2, the column labeled 3D-Resnet18 corresponds to the example 18-layer network shown in FIG. 1, and the column labeled 3D-Resnet34 corresponds to a deeper 34-layer network.

In particular embodiments, the 3D-ResNet networks shown in FIGS. 1, 2A (R3D 208) and 2B may be trained on the UCF101 action recognition data set, train split 1, using stochastic gradient descent with mini-batch size of 20. Video frames may be scaled to 128×171 and randomly cropped to 112×112. Batch normalization may be applied at each convolution layer. The learning rate may be set to, e.g., 0:01 and divided by 10 after every N (e.g., 20k) iterations. Training may be done at, e.g., 90K iterations (about 15 epochs). Baseline benchmarks are also performed using 2D-ResNet, in which the input is replaced with a single frame cropped to 112×112 and 3D operations (convolution and pooling) are replaced with 2D analogs. Compared to the 2D reference architectures, the 3DResNets perform better in accuracy tests, and the deeper networks (34 layers) show little gain over the 18-layer ones for 2D or 3D.

In particular embodiments, for performance evaluation benchmarks, by reducing the input size, the complexity of the network and the memory consumption of network training may be further reduced. With a smaller input of 4×112×112, the stride of the conv5_1 layer may be adjusted to 1×2×2. This simplification has been observed to reduce the complexity of 3D-Resnet18, measured by number of floating point operations (FLOPs), by approximately 50% while maintaining accuracy on benchmark tests. This network architecture is referred to herein as SR18 (the Simplified 3D-Resnet18). According to benchmark results, using 4 frames of input and a depth-18 network (SR18) achieves good baseline performance and fast training on UCF101.

In particular embodiments, the SR18 network may be used in a benchmark test to evaluate performance for different frame sampling rates. In this benchmark test, the temporal stride of the input frames may be varied in the set {11, 2, 4, 8, 16, 32}. In the lowest test input, the input may be 4 consecutive frames, which may be roughly a ⅛-second-long clip. On the other hand, using stride 32 the input clip may be coarsely sampled from a 128-frame long clip (approximately 4.5 to 5 seconds). According to benchmark tests with SR18 trained on inputs with different sampling rates, for video classification, sampling one frame out of every 2-4 (for videos within 25-30 fps), and using clip lengths between 0.25 s and 0.75 s may be advantageous for accuracy.

In particular embodiments, to evaluate performance of video classification for different input resolutions, an experiment may be performed with 3 different input resolutions of 224×224, 112×112, and 56×56 with re-scaled frame size 256×342, 128×171, and 64×86, respectively. The kernel size of the conv1 layers of these networks may be adjusted so that they have similar receptive fields, using 3×11×11, 3×7×7, 3×5×5 with stride of 1×4×4, 1×2×2, 1×1×1 for input resolution 224, 112, and 56, respectively. Accuracy benchmarks show that an input resolution of 128 (crop 112) may be advantageous both for computational complexity and accuracy of video classification given the memory constraints of the particular GPU used in the benchmarks.

In particular embodiments, video classification may be performed using a particular type of convolution. The type of convolution may be, e.g., 2D ConvNet as in two stream networks or 3D ConvNet, or a ConvNet with mixtures of 2D and 3D operations. The video classification performance of mixed 3D-2D ConvNet and mixed 2D-1D ConvNet are compared with a full-3D ConvNet (SR18). Mixed 3D-2D ConvNets using accuracy benchmarks. Motion modeling may be, in some applications or settings, more beneficial at certain low levels (early layers) while at higher levels of semantic abstraction (later layers), motion or temporal modeling may be less beneficial. Thus, architectures may start with 3D convolutions and switch to using 2D convolutions at the top layers. As SR18 has 5 groups of convolutions, a first variation is to replace all 3D convolutions in group 5 by 2D convolutions. This variant is referred to herein as MC5 (mixed convolutions). Similarly, groups 4 and 5 are replaced with 2D convolutions to produce a variation referred to herein as MC4 (meaning from group 4 and deeper layers all convolutions are 2D). Following this pattern, MC3, MC2, and MC1 variations are also created. Note that MC1 is equivalent to a 2D ConvNet applied on clip inputs, which differs slightly from the architecture presented in FIG. 2, which may be understood as a 2D-Resnet18 applied on frame inputs. To constrain the model capacity, in these benchmarks, the number of filters in each group of conv1_x to conv5_x is set to k, k, 2k, 4k, 8k, respectively, where k is the network width. When 3D convolution kernels (3×d×d) are replaced by 2D convolutions (1×d× d), there is a reduction in the number of parameters; k may then be adjusted as needed to keep the capacity comparable to SR18.

FIG. 3A illustrates an example 3D convolution layer 302. FIG. 3B illustrates an example mixed 2D and 1D convolution block 304 having the same input channels and output channels as the 3D convolution layer 302. The mixed convolution block 304 is also referred to herein as a "2.5D" block. In certain applications or settings, 3D convolutions may not be required, since 3D convolutions can be approximated by a 2D convolution followed by a 1D convolution, thereby decomposing spatial and temporal modeling into separate steps. In particular embodiments, as described above with reference to the Res2.5D architecture of FIG. 2A, a 2.5D ConvNet architecture may be constructed by replacing each t× d× d 3D convolution layer 302 having n input and m output channels with a 2.5D block 304 consisting of a 1×d× d 2D convolution layer 306 and a t×1×1 1D convolution layer 308 having $M_i$ internal channel connections such that the number of parameters is comparable. The value of t may be, e.g., 2, 3, 4, or the like.

In particular embodiments, the 3D convolution layer 302 has n=$N_{i-1}$ input channels and m=$N_i$ output channels. The mixed convolution block 304 has the same n input channels and m output channels as the 3D convolution layer 302. The spatial size of the filters may be d in the length and width directions, the temporal size of the filters may be t, and $M_i$ may be the number of output channels for the 2D convolution layer 306 and the number of input channels for the 1D convolution layer 308. The value Mi may be chosen so that the number of parameters in the 2.5D block 304 is equal to or approximately equal to that of the 3D convolution 302, as described above with reference to the Res2.5D architecture of FIG. 2A. If the 3D convolution 302 has spatial and temporal striding (e.g., down-sampling), the striding may also be decomposed according to its corresponding spatial or temporal convolutions. Based on a comparison of results of these convolution benchmarks results, using 3D convolutions across all layers of the network improves video classification performance.

In particular embodiments, to evaluate different network depths, the SR18 network may be used as a reference architecture, and the network depth may be varied with the same constraint on number of parameters. The network width may be set to k such that all convolution layers in group 1 and 2 (conv1 and conv2_x) have k output filters, conv_3x, conv_4x, and conv_5x have 2k, 4k, and 8k output filters, respectively. Changing the number of blocks in each group produces networks of different depth, and again k is adjusted to match the number of parameters. According to benchmark results, although D16, D18, and D26 provide a similar accuracy, D18 has a lower complexity than D16, and consumes less memory than D26. Thus, a network depth of 18 layers may provide an advantageous trade-off between accuracy, computational complexity, and memory for video classification.

Figure 4:
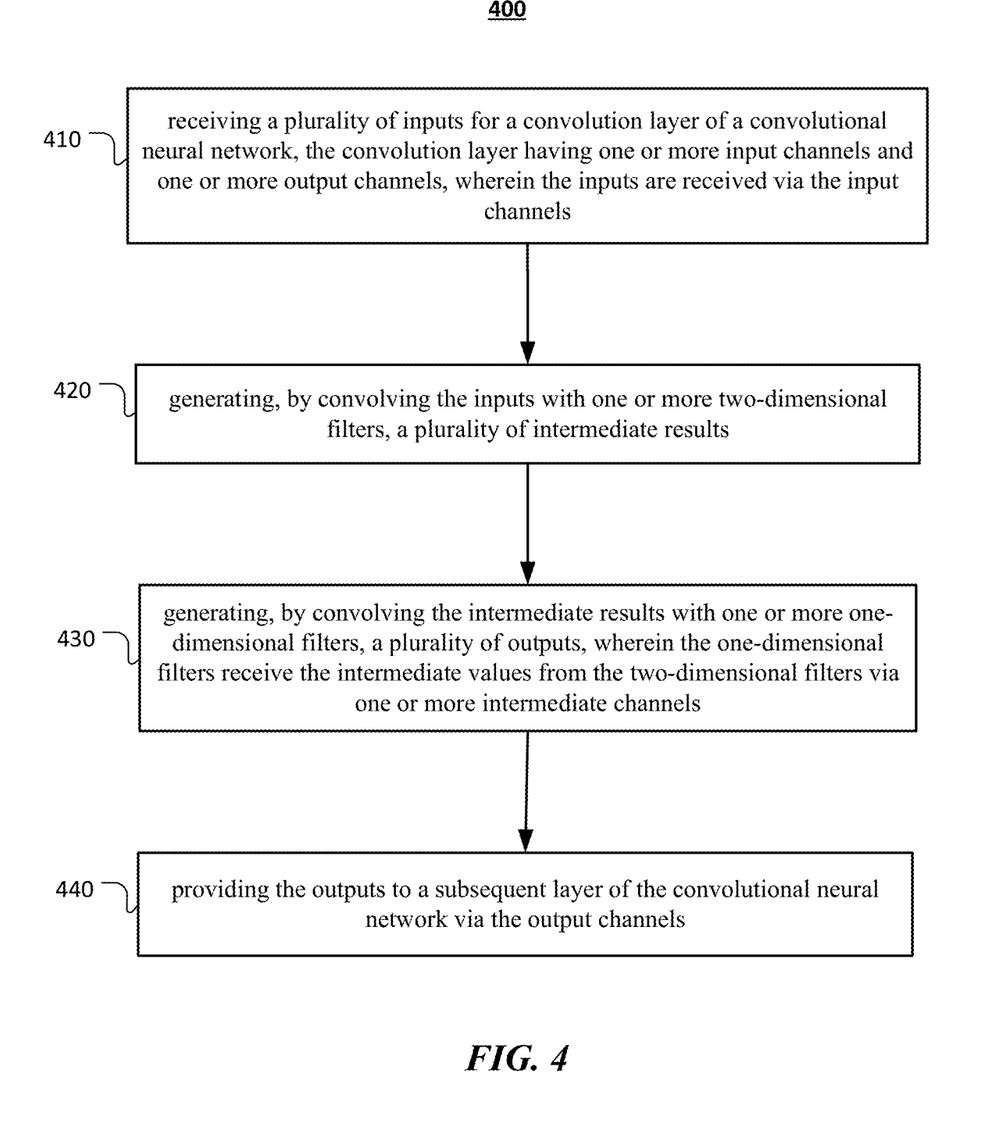
FIG. 4 illustrates an example method for using a mixed 2D and 1D convolution block in a convolutional network.

FIG. 4 illustrates an example method 400 for using a mixed 2D and 1D convolution block in a convolutional network. The method may begin at step 410 by receiving a set of inputs for a convolution layer of a convolutional neural network, the convolution layer having one or more input channels and one or more output channels, wherein the inputs are received via the input channels. The inputs may be image data such as video, photos, or the like. At step 420, the method may generate, by convolving the inputs with one or more two-dimensional filters, a plurality of intermediate values. At step 430, the method may generate, by convolving the intermediate values with one or more one-dimensional filters, a plurality of outputs, wherein the one-dimensional filters receive the intermediate values from the two-dimensional filters via one or more intermediate channels. Each of the two dimensions of the two-dimensional filter may correspond to a spatial dimension, and the one dimension of the one-dimensional filter may correspond to a temporal dimension. As an example, the two dimensions of the two-dimensional filter may correspond to the height and width of frames of an input video, and the one dimension of the one-dimensional filter may correspond to a plurality of frames of the video.

In particular embodiments, the number of intermediate channels may be determined as a value $M_i$ based on the number of input channels, the number of output channels, a size of the at least one two-dimensional filter, and a size of the at least one one-dimensional filter, as described above with reference to the Res2.5D architecture of FIG. 2A. The size of the two-dimensional filter, e.g., d, may correspond to the number of elements in each of the two dimensions of the two-dimensional filter. The size of the one-dimensional filter, e.g., t, may correspond to the number of elements in the one dimension of the one-dimensional filter.

In particular embodiments, the number of two-dimensional filters may be based on the number of intermediate channels $M_i$. For example, there may be a different two-dimensional filter for each of the intermediate channels, and each two-dimensional filter may be used to generate the intermediate values associated with the corresponding intermediate channel. The number of one-dimensional filters may be based on the number of output channels. For example, there may be a different one-dimensional filter for each of the output channels, and each one-dimensional filter may be used to generate the output values associated with the corresponding output channel.

In particular embodiments, the one- and two-dimensional filters may replace a corresponding three-dimensional filter of dimensions t× d× d. The configurations of the one- and two-dimensional filters, such as the numbers of inputs and outputs, and the number of intermediate channels, may be determined based on the replaced three-dimensional filter. The one-dimensional filter may have dimensions t×1×1 (e.g., t elements), and the two-dimensional filter may have dimensions 1×d× d (e.g., $d^2$ elements). The two-dimensional filter may have the same number of input channels (e.g., $N_{i-1}$) as the replaced three-dimensional filter.

In particular embodiments, a first dimension of the three-dimensional filter, e.g., the temporal dimension, may correspond to the one dimension of the one-dimensional filter, and the second and third dimensions of the three-dimensional filter, e.g., the spatial dimensions, may correspond to the first and second dimensions of the two-dimensional filter. The first dimension of the three-dimensional filter may have the same number of elements as the one dimension of the one-dimensional filter (e.g., t elements), and each of the second and third dimensions of the three-dimensional filter may have the same number of elements as the corresponding dimension of the two-dimensional filter (e.g., d elements). The two-dimensional filter may have the same number of output channels as the three-dimensional filter (e.g., $N_t$).

At step 440, the method may provide the outputs to a subsequent layer of the convolutional neural network via the output channels. The convolutional neural network may generate a classification of the input video, and the classification may be provided as one of the outputs. The classification may be selected from a set of predetermined classifications, such as classes of objects or of actions, e.g., human action classes such as Human-Object Interaction, Body Motion Only, Human-Human Interaction, Playing Musical Instruments, Sports, and so on. Set of predetermined classifications may include more specific classes, e.g., Biking, Billiards Shot, Drumming, and so on. The classes may be, e.g., the action classes defined in a dataset such as UCF101 or the like.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for using a mixed 2D and 1D convolution layer in a convolutional network including the particular steps of the method of FIG. 4, this disclosure contemplates any suitable method for using a mixed 2D and 1D convolution layer in a convolutional network including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
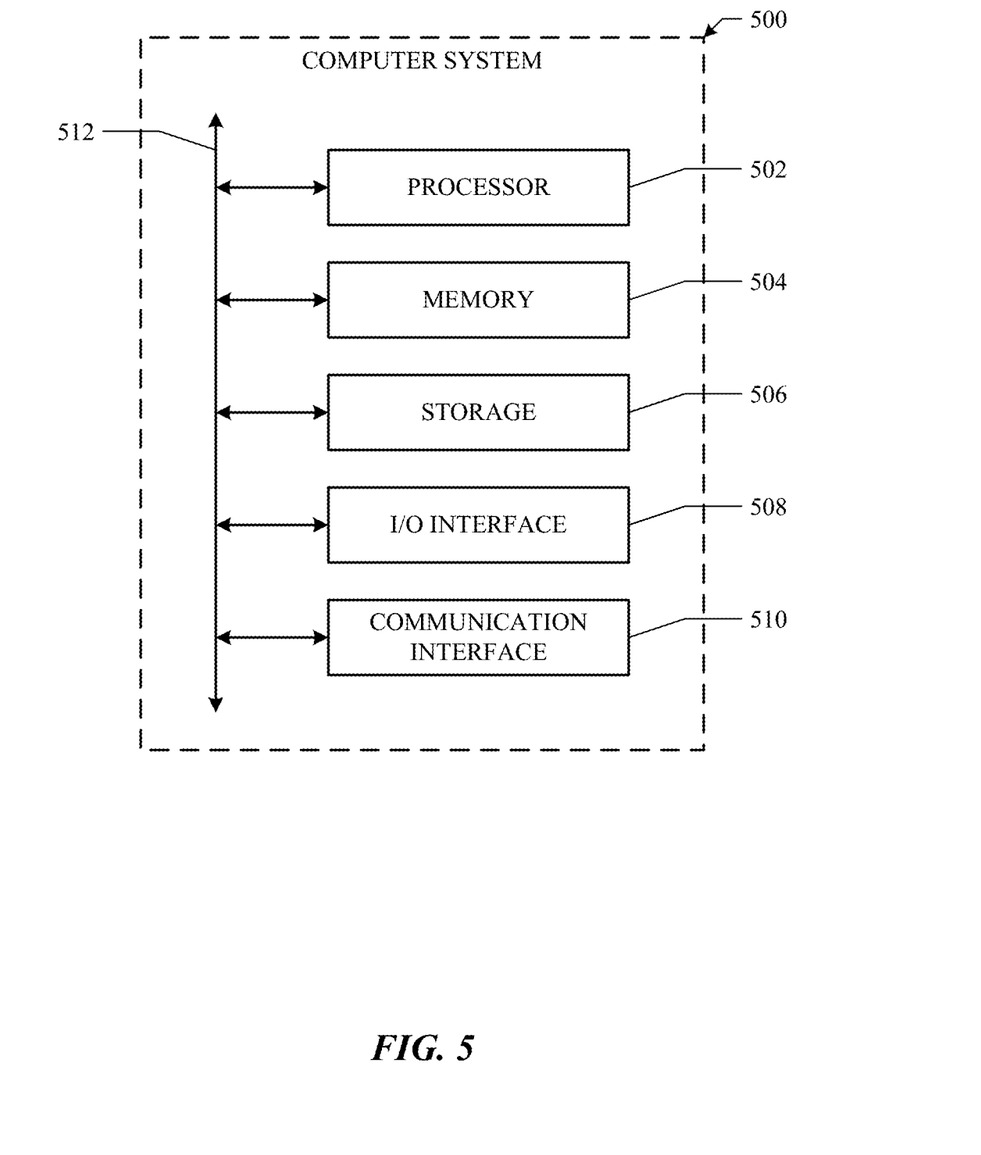
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising, by a computing device:
   receiving a plurality of inputs for a convolution layer of a convolutional neural network, the convolution layer having one or more input channels and one or more output channels, wherein the inputs are received via the input channels;
   generating, by convolving the inputs with one or more two-dimensional filters, a plurality of intermediate values, wherein a size of each two-dimensional filter corresponds to a number of elements in each dimension of the two-dimensional filter; and
   generating, by convolving the intermediate values with one or more one-dimensional filters, a plurality of outputs, wherein the one-dimensional filters receive the intermediate values from the two-dimensional filters via one or more intermediate channels, and wherein a size of the one-dimensional filter corresponds to a number of elements in the one dimension of the one-dimensional filter.

2. The method of claim 1, wherein each of the two dimensions of the two-dimensional filter corresponds to a spatial dimension, and the one dimension of the one-dimensional filter corresponds to a temporal dimension.

3. The method of claim 1, further comprising providing the outputs to a subsequent layer of the convolutional neural network via the output channels.

4. The method of claim 1, wherein the inputs comprise video, and the two dimensions of the two-dimensional filter correspond to the height and width of frames of the video.

5. The method of claim 4, wherein the one dimension of the one-dimensional filter corresponds to a plurality of frames of the video.

6. The method of claim 5, wherein the convolutional neural network generates a classification of a video received as input.

7. The method of claim 6, wherein the classification is selected from a plurality of predetermined classifications.

8. The method of claim 1, wherein the number of intermediate channels is determined based on the number of input channels, the number of output channels, a size of the at least one two-dimensional filter, and a size of the at least one one-dimensional filter.

9. The method of claim 1, wherein the number of two-dimensional filters is based on the number of intermediate channels.

10. The method of claim 1, wherein the number of one-dimensional filters is based on the number of output channels.

11. The method of claim 1, wherein the two-dimensional filter has the same number of input channels as a three-dimensional filter, wherein a first dimension of the three-dimensional filter corresponds to the one dimension of the one-dimensional filter, and the second and third dimensions of the three-dimensional filter correspond to the first and second dimensions of the two-dimensional filter.

12. The method of claim 11, wherein the first dimension of the three-dimensional filter has the same number of elements as the one dimension of the one-dimensional filter, and each of the second and third dimensions of the three-dimensional filter has the same number of elements as the corresponding dimension of the two-dimensional filter.

13. The method of claim 11, wherein the two-dimensional filter has the same number of output channels as the three-dimensional filter.

14. One or more computer-readable non-transitory storage media embodying software that is operable when executed to:
   receive a plurality of inputs for a convolution layer of a convolutional neural network, the convolution layer having one or more input channels and one or more output channels, wherein the inputs are received via the input channels;
   generate, by convolving the inputs with one or more two-dimensional filters, a plurality of intermediate values, wherein a size of each two-dimensional filter corresponds to a number of elements in each dimension of the two-dimensional filter; and
   generate, by convolving the intermediate values with one or more one-dimensional filters, a plurality of outputs, wherein the one-dimensional filters receive the intermediate values from the two-dimensional filters via one or more intermediate channels, and wherein a size of the one-dimensional filter corresponds to a number of elements in the one dimension of the one-dimensional filter.

15. The media of claim 14, wherein each of the two dimensions of the two-dimensional filter corresponds to a spatial dimension, and the one dimension of the one-dimensional filter corresponds to a temporal dimension.

16. The media of claim 14, wherein the software is further operable when executed to provide the outputs to a subsequent layer of the convolutional neural network via the output channels.

17. A system comprising: one or more processors; and a memory coupled to the processors comprising instructions executable by the processors, the processors being operable when executing the instructions to:
- receive a plurality of inputs for a convolution layer of a convolutional neural network, the convolution layer having one or more input channels and one or more output channels, wherein the inputs are received via the input channels;
- generate, by convolving the inputs with one or more two-dimensional filters, a plurality of intermediate values, wherein a size of each two-dimensional filter corresponds to a number of elements in each dimension of the two-dimensional filter; and
- generate, by convolving the intermediate values with one or more one-dimensional filters, a plurality of outputs, wherein the one-dimensional filters receive the intermediate values from the two-dimensional filters via one or more intermediate channels, and wherein a size of the one-dimensional filter corresponds to a number of elements in the one dimension of the one-dimensional filter.

18. The system of claim 17, wherein each of the two dimensions of the two-dimensional filter corresponds to a spatial dimension, and the one dimension of the one-dimensional filter corresponds to a temporal dimension.

19. The system of claim 17, wherein the processors are further operable when executing the instructions to provide the outputs to a subsequent layer of the convolutional neural network via the output channels.

* * * * *